US012090095B2

(12) United States Patent
Henderson et al.

(10) Patent No.: US 12,090,095 B2
(45) Date of Patent: Sep. 17, 2024

(54) LOWER EXTREMITY POSITIONING ASSEMBLY AND TABLE EXTENSION

(71) Applicant: Athello, Inc, Canton, GA (US)

(72) Inventors: Timothy Henderson, Philadelphia, PA (US); Quenten Cothren, Canton, GA (US)

(*) Notice: Subject to any disclaimer, the term of this patent is extended or adjusted under 35 U.S.C. 154(b) by 398 days.

(21) Appl. No.: 14/596,134

(22) Filed: Jan. 13, 2015

(65) Prior Publication Data

US 2015/0196447 A1 Jul. 16, 2015

Related U.S. Application Data

(60) Provisional application No. 61/926,941, filed on Jan. 13, 2014.

(51) Int. Cl.
*A61G 13/12* (2006.01)

(52) U.S. Cl.
CPC ....... *A61G 13/125* (2013.01); *A61G 13/1205* (2013.01); *A61G 13/123* (2013.01)

(58) Field of Classification Search
CPC ........ A61G 13/02; A61G 13/08; A61G 13/12; A61G 13/1205; A61G 13/123; A61G 13/125; A61G 13/1245; A61G 13/126; A61G 13/1285; A61G 13/1295; A61G 2013/0063; A61G 2013/0081; A61G 2210/10; A61G 7/075; A61G 7/0755
USPC .............................................................. 5/624
See application file for complete search history.

(56) References Cited

U.S. PATENT DOCUMENTS 4,443,005 A * 4/1984 Sugarman .............. A61G 13/12 378/208
4,886,258 A * 12/1989 Scott ...................... A61G 13/12 5/624
4,940,218 A * 7/1990 Akcelrod ........... A61G 13/0036 5/621
4,964,400 A * 10/1990 Laico ..................... A61G 13/12 128/878
5,645,079 A * 7/1997 Zahiri ................... A61F 5/3769 128/882
5,806,117 A * 9/1998 Gotfried ................ A61G 13/12 5/601
6,286,164 B1 * 9/2001 Lamb ................. A61G 13/0036 128/845
7,832,401 B2 * 11/2010 Torrie ................ A61G 13/0036 128/845
7,947,006 B2 * 5/2011 Torrie ................ A61G 13/0036 128/845
RE46,032 E * 6/2016 Torrie .................. A61H 1/0218
(Continued)

*Primary Examiner* — David R Hare
(74) *Attorney, Agent, or Firm* — Gugliotta & Gugliotta LPA

(57) ABSTRACT

Surgical assemblies which reduce stress on a patient lower extremity while facilitating surgical procedures are disclosed. A surgical table extension is disclosed for positioning lower extremities. The table extension comprises a limb manipulator, a base, a platform support, and a perineal post. In another aspect, a surgical table extension comprises a brace assembly which contacts a patient foot, ankle, lower leg, and thigh. The brace assembly is connected to a limb manipulator, enabling the lower extremity to be rotated and manipulated. Rotation forces are applied to both the foot and the thigh, reducing stress on the patient knee.

20 Claims, 12 Drawing Sheets

(56) References Cited

U.S. PATENT DOCUMENTS

| | | | | |
|---|---|---|---|---|
| 2002/0023298 | A1* | 2/2002 | Lamb | A61G 13/0036 5/600 |
| 2004/0003468 | A1* | 1/2004 | Mitsuishi | A61H 1/0237 5/624 |
| 2004/0133979 | A1* | 7/2004 | Newkirk | A61G 13/0036 5/600 |
| 2007/0251011 | A1* | 11/2007 | Matta | A61B 19/0248 5/624 |
| 2010/0263129 | A1* | 10/2010 | Aboujaoude | A61F 5/3761 5/650 |
| 2011/0023893 | A1* | 2/2011 | Striggow | A61G 13/12 128/882 |
| 2011/0099720 | A1* | 5/2011 | Wyslucha | A61G 13/0036 5/658 |
| 2013/0191995 | A1* | 8/2013 | Bellows | A61G 13/0036 5/624 |
| 2014/0068863 | A1* | 3/2014 | Clark | A61G 13/0036 5/621 |
| 2014/0215718 | A1* | 8/2014 | Wootton | A61G 13/0036 5/621 |
| 2015/0245971 | A1* | 9/2015 | Bernardoni | A61G 13/0036 5/601 |

* cited by examiner

LOWER EXTREMITY POSITIONING ASSEMBLY AND TABLE EXTENSION

CROSS REFERENCE TO RELATED APPLICATION

This application claims the benefit of U.S. Provisional Patent Application Ser. No. 61/926,941, filed Jan. 13, 2014, and entitled "Lower Extremity Positioning Assembly and Table Extension," the entire contents of which are incorporated herein by reference.

FIELD OF THE DISCLOSURE

The present disclosure relates to medical supports and more particularly to devices useful for positioning a lower extremity during a procedure.

BACKGROUND

The statements in this section merely provide background information related to the present disclosure and may not constitute prior art.

Operations on lower extremities, such as anterior hip replacement procedures, require consistent and precise positioning and manipulation of the patient's lower extremities. Furthermore, many less invasive surgical procedures require greater movement of the patient's lower extremities during the procedure, may place the patient's lower extremity in unusual positions, or may require placement of the lower extremity accurate to the millimeter. In particular, procedures such as a direct anterior hip replacement procedure require at least one of two things, in addition to a skilled surgeon: a significant number of assistants on hand in the operating room to manipulate the lower extremity, or a surgical table designed to manipulate and support the lower extremity.

Most surgeons do not have the manpower necessary to provide the manipulation required for lower extremity procedures. The weight and size of a patient may preclude utilization of assistants alone, even where the manpower does exist. There is a limit to how much external rotation can be achieved using only assistants. Furthermore, accurate placement of the lower extremity is difficult to achieve.

Current surgical tables and table extensions used to manipulate a lower extremity use a foot/ankle distal lower leg-based rotation system. These systems, which are employed with the use of a boot, rotate the leg using torque placed on the foot/ankle and distal lower leg to provide better access to the proximal femur for performing the surgical procedure. Such torqueing places increased and prolonged stress upon the patient's knee. This stress is problematic for healthy knees and poses an injury risk. This injury risk is heightened for patients with total knee replacements, surgically repaired knees, injured knees, or the like, as well as elderly patients, patients affected by osteoporosis, and the like. Furthermore, the use of a torque-producing boot requires excess rotation at the foot and ankle, as some rotation is lost through the knee.

Less invasive or minimally invasive procedures are desirable because the morbidity of the procedure is reduced, hospital stay length is reduced, and some less invasive or minimally invasive procedures do not require cutting through or releasing any muscles or tendons.

Furthermore, current surgical tables and table extensions utilized to facilitate lower extremity procedures (e.g., direct anterior hip replacement) weigh hundreds of pounds and utilize a traction mechanism or similar component to help rotate the lower extremity to allow for ligament releases, exposure of the femur, dislocation and relocation, and the like. Such devices require two-handed or two-step single hand manipulation to rotate the extremity. Such manipulation makes it more difficult to raise or lower the operative leg holder while simultaneously rotating, abducting, or adducting the lower extremity.

Given the foregoing, what is needed are surgical assemblies which facilitate positioning of lower extremities in a precise and repeatable fashion. Additionally, surgical assemblies and tables are needed which provide more even distribution of force throughout the entire lower extremity (foot, ankle, lower leg, knee and thigh), thereby requiring less external rotation, to achieve acceptable rotation and position at the proximal femur and hip. Additionally, surgical assemblies are needed which facilitate multiple simultaneous manipulations of the lower extremity.

SUMMARY

This Summary is provided to introduce a selection of concepts in a simplified form that are further described below in the Detailed Description. This Summary is not intended to identify key features or essential features of the subject matter, nor is it intended to be used to limit the scope of the subject matter.

This disclosure addresses the above-described needs by providing surgical table extensions and surgical assemblies which facilitate positioning of a lower extremity. Aspects of the present disclosure facilitate manipulation of a lower extremity during a surgical procedure wherein torques are applied to the foot, ankle and lower leg, thereby more evenly distributing torques throughout the lower extremity during manipulation and placement. Furthermore, aspects of the present disclosure comprise a limb coupler, operable by one hand, which facilitates multiple simultaneous manipulations of the lower extremity.

In an aspect, a surgical table extension is disclosed for positioning lower extremities. The table extension comprises a limb manipulator, a base, a platform support, and a perineal post. The limb manipulator rotates a proximal femur zero to 180 degrees, can drop the foot to the floor, and can elevate (or lower) the proximal femur to allow for safe access to the femur and acetabulum in all patients. The limb manipulator is positionable for utilization with a right leg or a left leg, thereby reducing the need for a surgical table or extension to be equipped with components to provide a full range of manipulation for both lower extremities.

In another aspect, a brace assembly is disclosed which contacts a patient foot, ankle, lower leg and thigh. The brace assembly is connected to a limb manipulator, enabling the lower extremity to be rotated and manipulated. Torques and forces applied by the limb manipulator are applied more evenly across the lower extremity, reducing stresses on the knee, as well as other portions of the lower extremity, thereby reducing the likelihood of injury. The brace assembly allows for flexion and extension of the knee while protecting it from rotational forces.

In another aspect, a limb coupler is disclosed which rotates an attached lower extremity via single-hand operation. Such operation frees the operator to use a second hand for traction and/or raising the lower extremity.

Aspects of the present disclosure may be utilized in surgical procedures relating to the hip, the femur, and other portions of the lower extremities. Furthermore, aspects of the present disclosure may be utilized to facilitate fracture procedures.

Further features and advantages of the systems and apparatus disclosed herein, as well as the structure and operation of various aspects of the present disclosure, are described in detail below with reference to the accompanying figures.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to surgical table extensions and surgical assemblies which facilitate positioning of a lower extremity.

Aspects of the present disclosure facilitate manipulation of a lower extremity during a surgical procedure wherein torques are applied to the foot, ankle and lower leg, thereby more evenly distributing torques to the lower extremity during manipulation and placement. Furthermore, aspects of the present disclosure comprise a limb coupler, operable by one hand, which facilitates multiple simultaneous manipulations of the lower extremity.

In an aspect, a surgical table extension is disclosed for positioning lower extremities. The table extension comprises a limb manipulator, a base, a platform support and a perineal post. The limb manipulator rotates a proximal femur zero to 180 degrees, can drop the foot to the floor, and can elevate (or lower) the proximal femur to allow for safe access to the femur and acetabulum in all patients. The limb manipulator is positionable for utilization with a right leg or a left leg. The limb coupler facilitates rotation of an attached lower extremity via single-hand operation.

In an aspect, the surgical table extension comprises a brace assembly which contacts a patient foot, ankle, lower leg, and thigh. The brace assembly is connected to a limb manipulator, enabling the lower extremity to be rotated and manipulated. Rotation forces are applied to both the foot and the thigh, reducing stress on the patient knee.

Figure 1A:
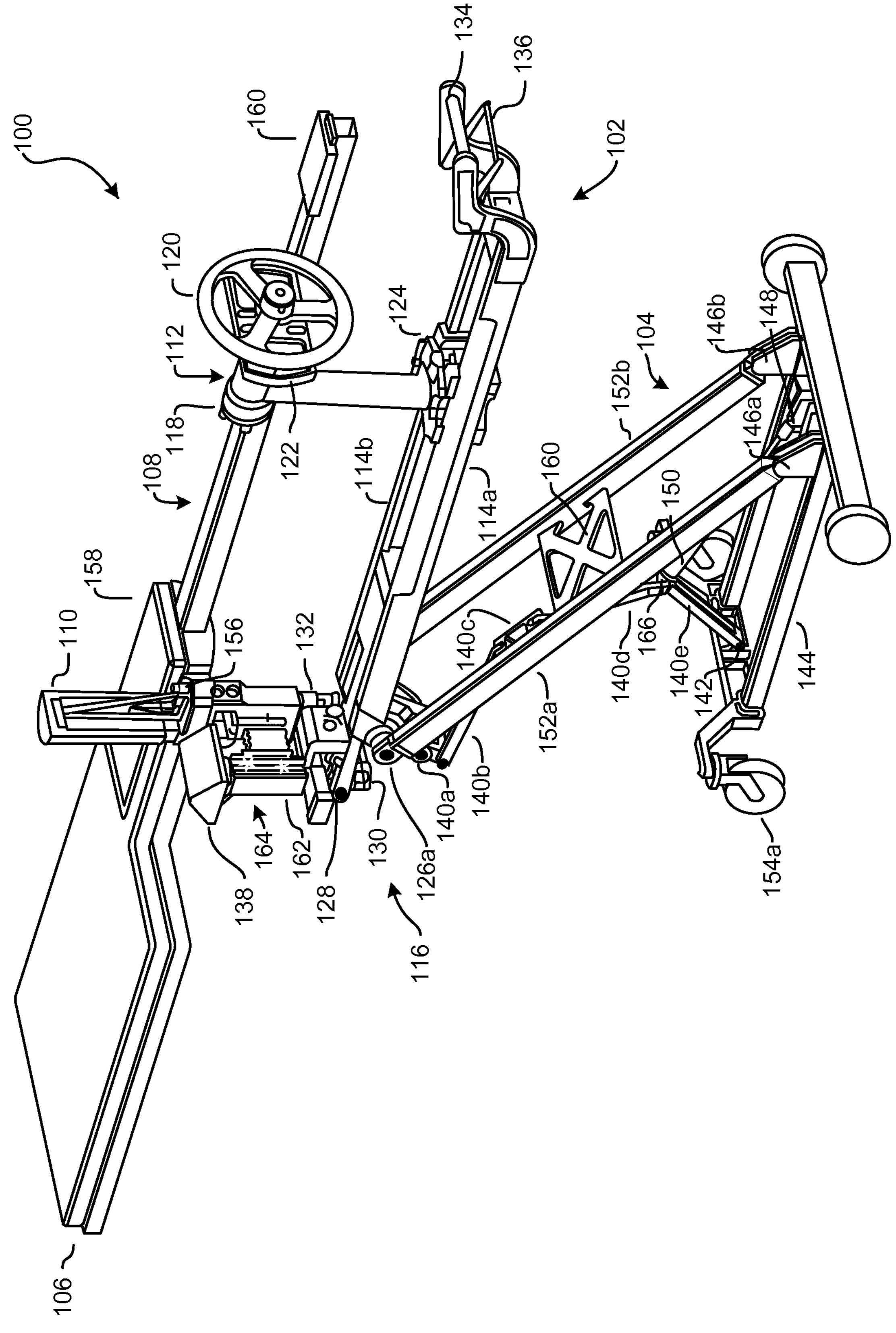
FIGS. 1A & 1B are perspective views of a surgical table extension assembly useful for positioning a lower extremity, in accordance with an aspect of the present disclosure.
Figure 1B:
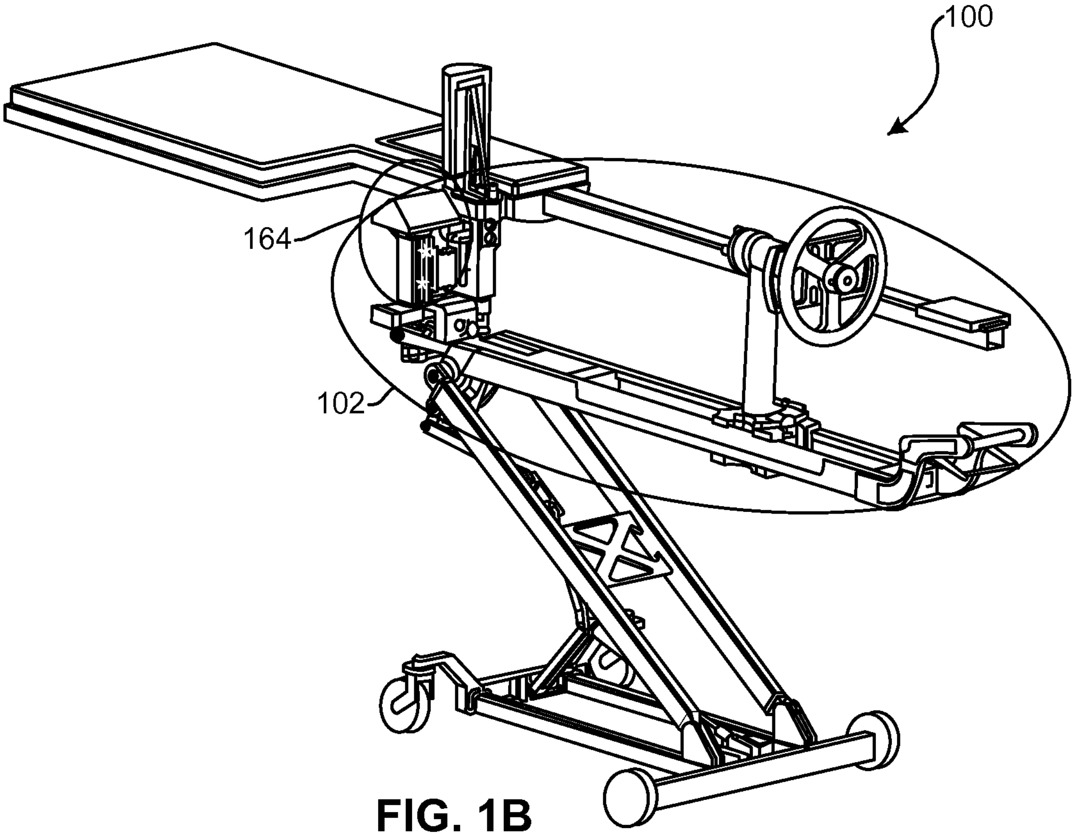

Referring to FIGS. 1A & 1 B, perspective views of a surgical table extension assembly 100 useful for positioning a lower extremity, in accordance with an aspect of the present disclosure, are shown.

Table extension 100 facilitates manipulation and positioning of lower extremities for surgical procedures. Table extension 100 comprises a limb manipulator assembly 102, a base 104, a platform support 106, a dynamic limb support 108, and a perineal post 110. In an aspect, dynamic limb support 108 is omitted.

Portions of table extension 100 may be constructed of rigid materials such as aluminum, stainless steel, carbon fiber, fiberglass, titanium, plastic, and the like. In an aspect, table extension 100 is constructed of lightweight materials, weighing less than seventy-five pounds, thereby enabling easy transportation between surgical sites and ease of setup.

Figure 6:
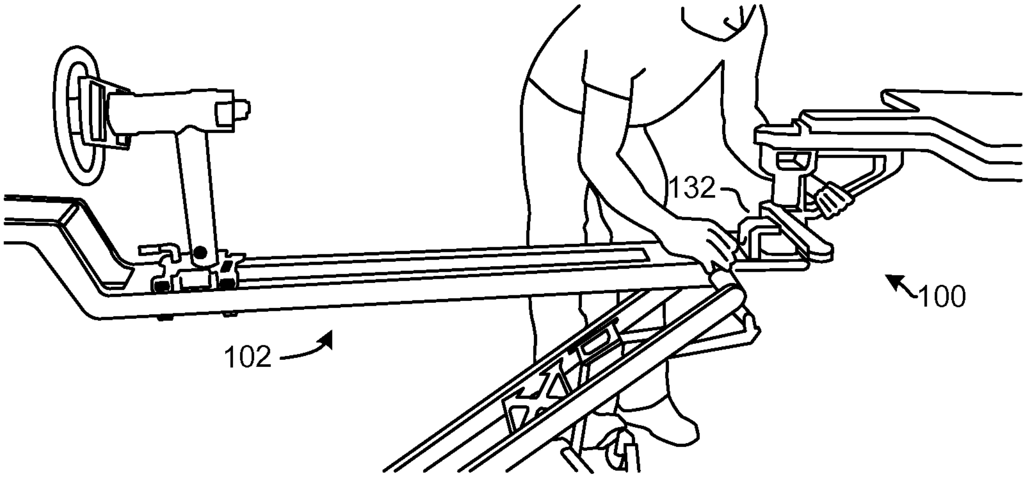
FIG. 6 is an image of a surgical table extension assembly configured to manipulate a patient left leg, in accordance with an aspect of the present disclosure.
Figure 7:
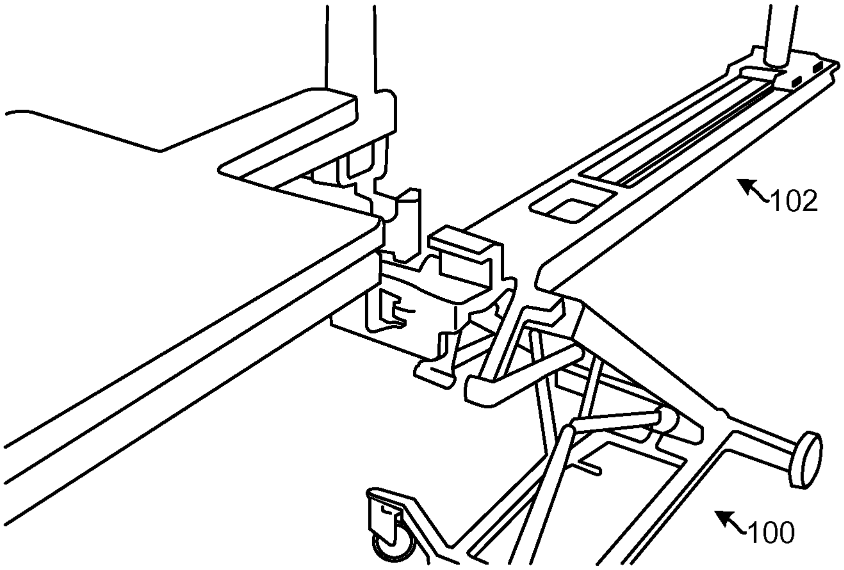
FIG. 7 is an image of a surgical table extension assembly configured to manipulate a patient right leg, in accordance with an aspect of the present disclosure.

Limb manipulator assembly 102 moves and positions a lower extremity by rotating the lower extremity, raising or lowering the lower extremity, moving the lower extremity relative to the patient body sagittal plane, and moving the patient foot relative to the patient body transverse plane. Via movement about central connector 132, limb manipulator assembly 102 may be utilized on a left lower extremity (FIG. 6) or a right lower extremity (FIG. 7).

Limb manipulator assembly 102 comprises limb coupler 112, one or more arms 114 (labeled as arms 114a-b in FIG. 1A) and positioning assembly 116.

Limb coupler 112 connects a patient lower extremity to limb manipulator assembly 102. Limb coupler 112 facilitates rotation of the patient lower extremity and movement of the patient foot relative to the patient body transverse plane. Limb coupler 112 comprises a connector 118, a limb coupler handle 120, and a limb coupler lock release 122. Connector 118 removably connects to accessories such as brace assembly 1600, a traction boot, a foot rest, and the like. Connector 118 may be rotated in any direction, locks in place and is rotatably connected to limb coupler handle 120 via a shaft (not shown).

In order to rotate an attached lower extremity via limb coupler 112, limb coupler lock release 122 must be actuated by squeezing limb coupler lock release 122 toward limb coupler handle 120. While limb coupler lock release 122 is actuated, limb coupler handle may be rotated, thereby rotating the lower extremity. In another aspect, the lower extremity is mechanically actuated.

In another aspect, limb coupler 112 is a traction device or other mechanism apparent to one skilled in the relevant art(s) after reading the description herein.

In an aspect, limb coupler 112 moves relative to the patient body transverse plane via rails integrated into arms 114. Slide 124 is capable of gross movement and fine movement along rails. Limb coupler 112 may be manually manipulated relative to the patient body transverse plane. In another aspect, movement of limb coupler 112 is mechanically actuated.

Arms 114 are interconnected by arm handle 134. Arm handle 134 allows an individual to raise and lower the lower extremity. In order to alter the vertical position of the lower extremity, the vertical lock release 136 must be actuated by squeezing vertical lock release 136 toward arm handle 134. While vertical lock release 136 is actuated, the vertical position of the lower extremity may be altered via movement of limb manipulator assembly 102.

Figure 15:
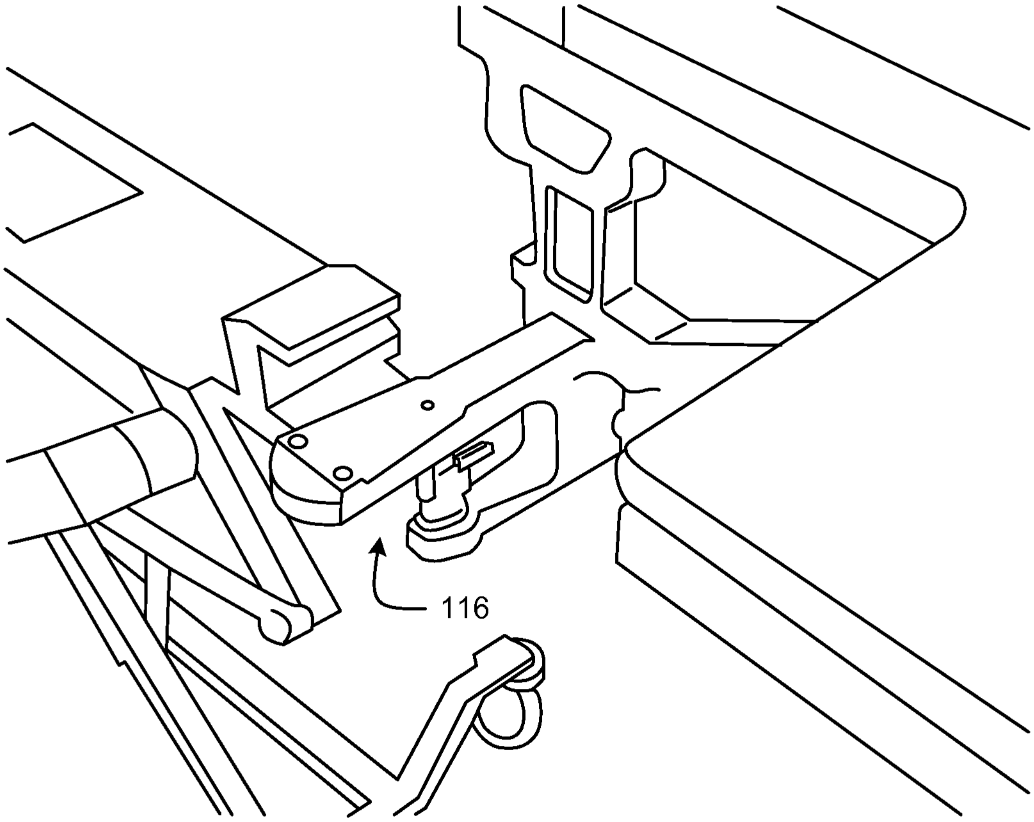
FIG. 15 is a detail view of a positioning assembly of a surgical table extension assembly, in accordance with an aspect of the present disclosure.

Positioning assembly 116 (shown in detail in FIG. 15) may be the point about which the lower extremity is manipulated in various directions. Positioning assembly 116 comprises vertical connection 128 and sagittal connection 130. The lower extremity moves up and down via rotation of arms 114 about vertical connection 128. The lower extremity moves relative to the sagittal plane about sagittal connection 130.

Hip lift 164 comprises an actuator 162 and a hip support 138. Actuator 162 may be a linear actuator, a pneumatic ram, a hydraulic piston, an electric motor, and the like. Hip lift 164 is positioned behind the femur, hip, or buttocks and elevates the contacted area in order to facilitate preparation and placement of the femur. Actuator 162 raises or lowers the femur to allow for hip relocation/reduction interoperatively. In an aspect, actuator 162 is a pneumatic piston controlled by a foot pump and release valve. Actuator 162 may be controlled by a controller such as a hand switch, foot controller, or another device. The controller may be operated by the surgeon, an assistant, or a third party.

Hip lift 164 may be positioned above positioning assembly 116.

Base 104 comprises frame 144, wheels (labelled, for clarity, only as wheel 154*a* in FIG. 1A), support members 152 (labeled as support members 152*a-b* in FIG. 1A), linkages 140 (labeled as linkages 140*a-e* in FIG. 1A) and vertical actuator 150. Support members 152 are rotatably connected to limb manipulator assembly 102 at top connections 126 (labeled, for clarity, only as top connection 126*a* in FIG. 1A) and are rotatably connected to frame 144 at bottom connections 146 (labeled as bottom connections 146*a-b* in FIG. 1A). Support members 152 are interconnected by crossmember 160. Linkages 140 connect to limb manipulator assembly 102 at top connection 126 and connect to frame 144 at linkage connection 142.

The vertical position of limb manipulator assembly 102 is controlled by vertical actuator 150. Vertical actuator 150 may be a linear actuator, a pneumatic ram, a hydraulic piston, an electric motor, and the like. Vertical actuator 150 is connected to linkages 140 at first vertical actuator connection 166 and to frame 144 at second vertical actuator connection 148.

Figure 14:
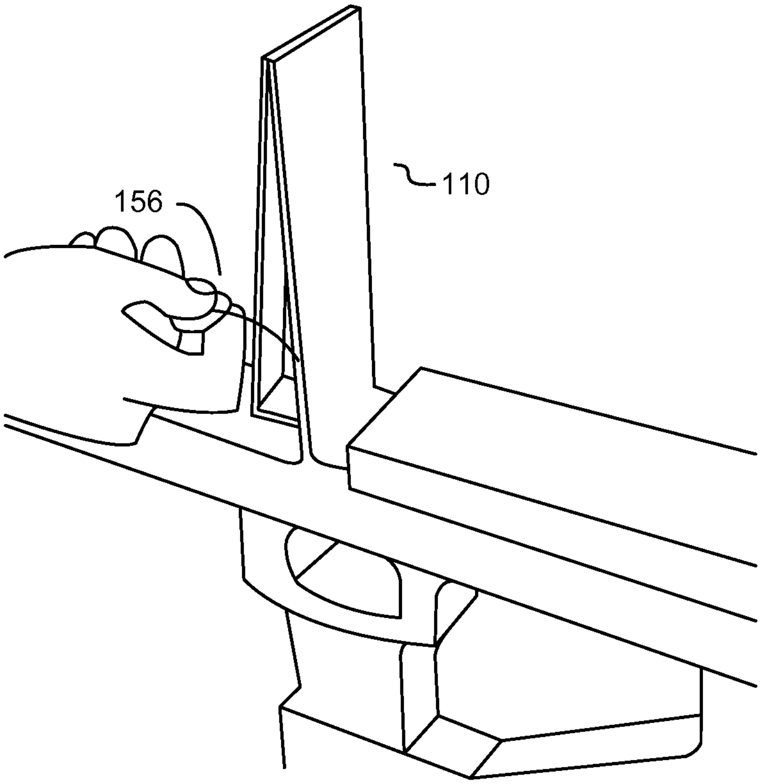
FIG. 14 is a detail view of a perineal post being installed, in accordance with an aspect of the present disclosure.

Perineal post 110 may be removably installed via pin 156 (FIG. 14). Perineal post 110 supports the patient during surgical procedures and may comprise padding.

Platform support 106 may be placed over a surgical table. The patient may rest on platform support 106. Platform support 106 may comprise padding. In an aspect, platform support 106 further comprises table connections (not shown) which removably connect assembly 100 to a surgical table. In another aspect, platform support 106 is a surgical table.

Dynamic limb support 108 is configured to support a patient limb. Dynamic limb support 108 may be removably connected to assembly 100. Dynamic limb support 108 is slidable toward or away from the patient transverse plane. Proximal static support 158 provides support for the patient leg. Distal static support 160 provides support for the patient leg at the ankle or lower leg. At the distal portion of dynamic limb support 108, additional elements may be attached, such as a footrest or foot restraint. Dynamic limb support 108 may be used to facilitate fracturing procedures such as a hip fracture.

Figure 2:
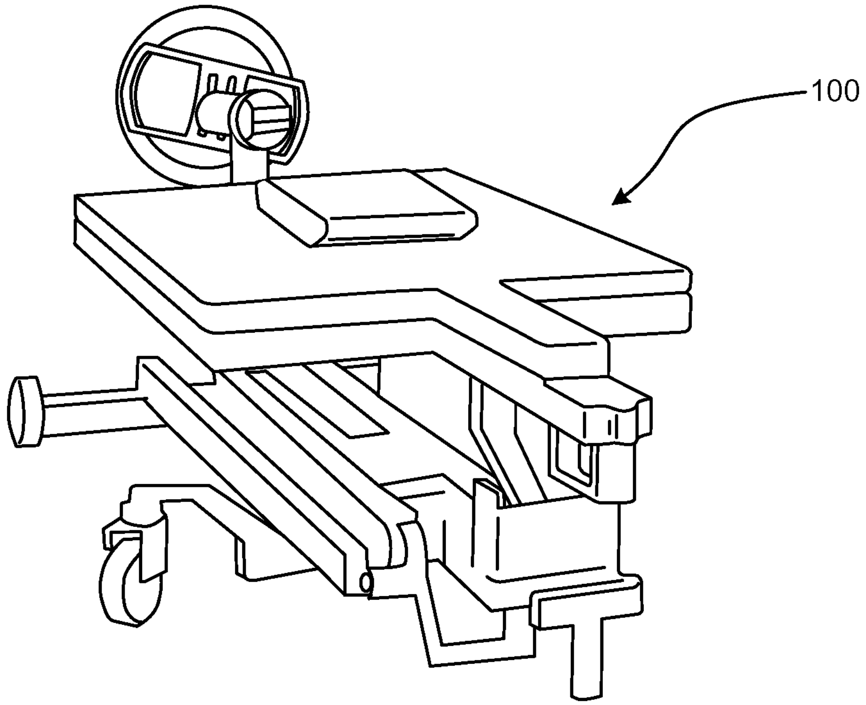
FIG. 2 is an image of a surgical table extension assembly in a stowed position, in accordance with an aspect of the present disclosure.
Figure 3:
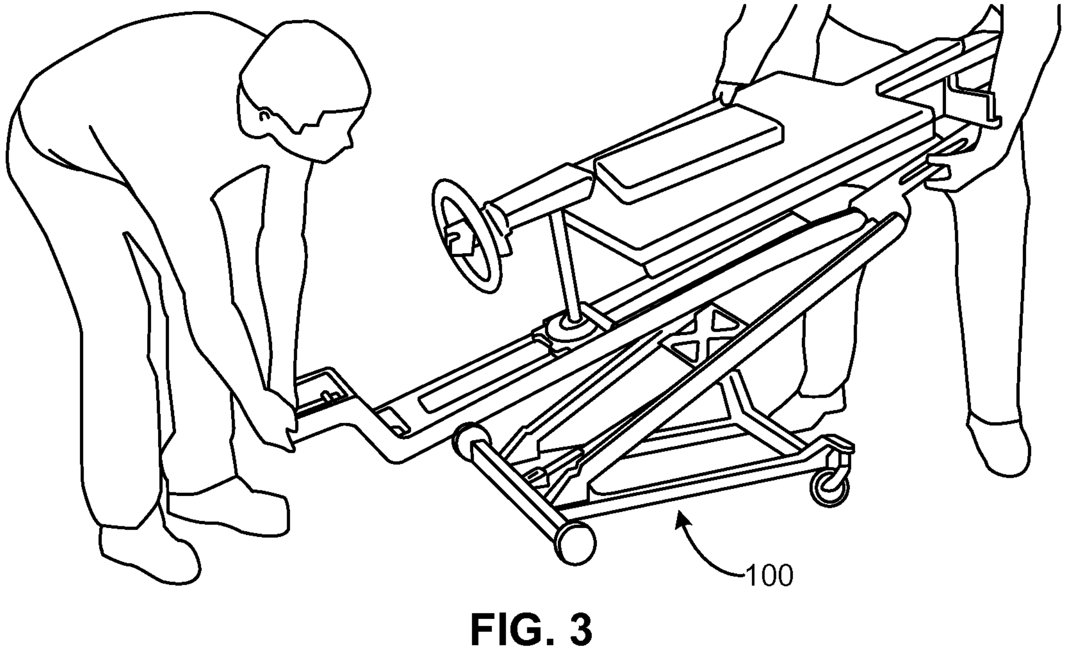
FIG. 3 is an image of a surgical table extension assembly being deployed, the base being first extended, in accordance with an aspect of the present disclosure.
Figure 4:
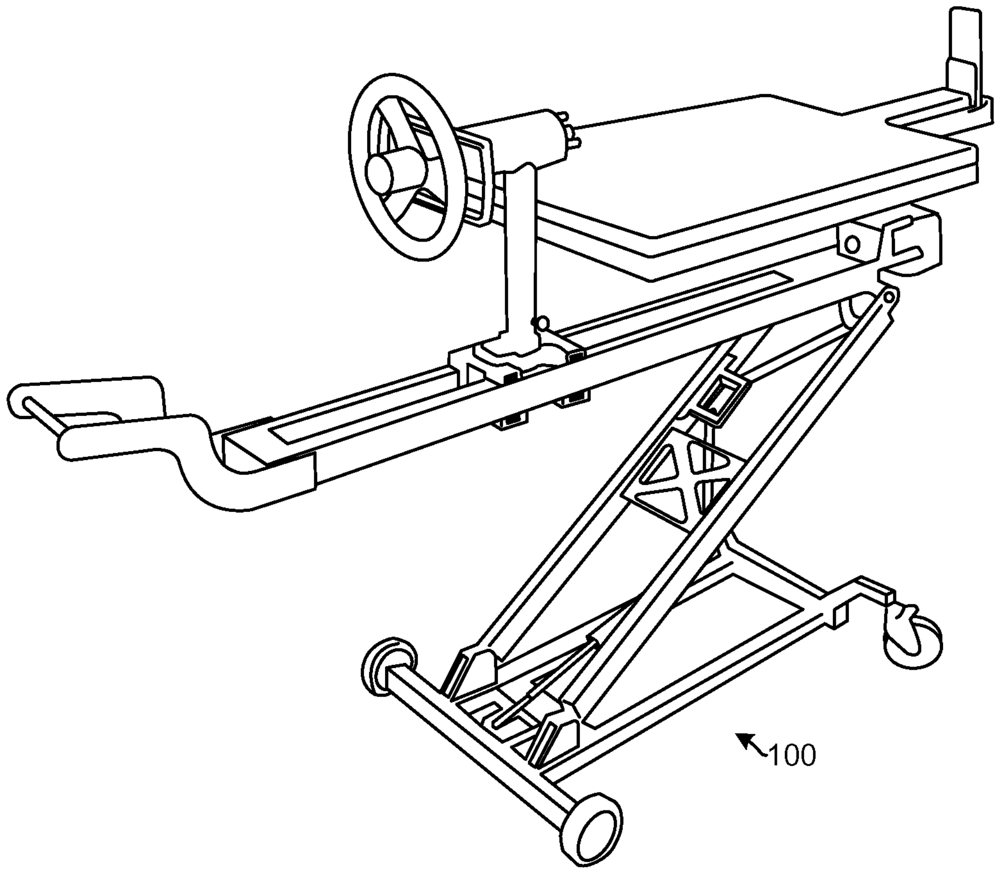
FIG. 4 is an image of a surgical table extension assembly wherein the base is fully deployed, in accordance with an aspect of the present disclosure.
Figure 5:
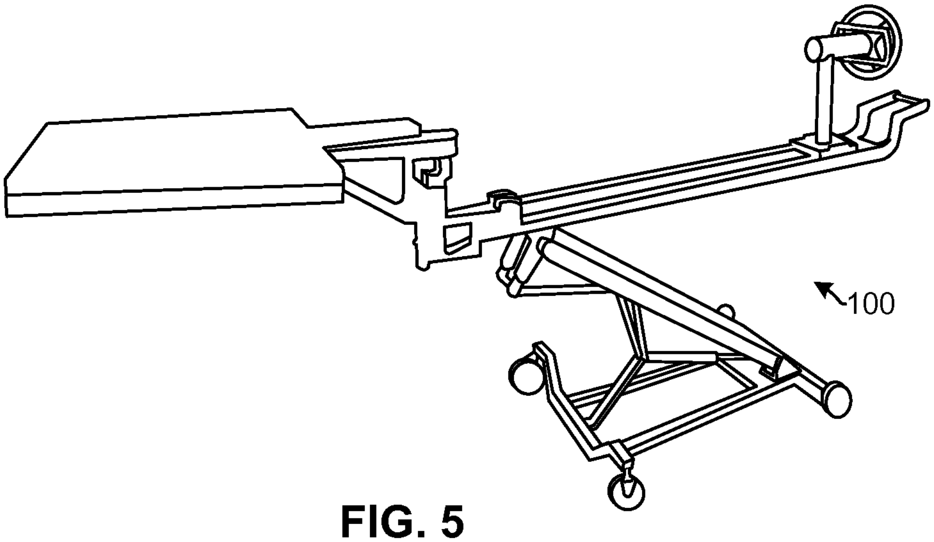
FIG. 5 is an image of a deployed surgical table extension assembly, in accordance with an aspect of the present disclosure.

Referring now to FIGS. 2 through 5, a sequence of images of surgical table extension assembly 100, in accordance with an aspect of the present disclosure, are shown wherein assembly 100 is deployed from the stowed configuration depicted in FIG. 2. Assembly 100 is lightweight and storable, enabling assembly 100 to be transported easily and reducing the area occupied when assembly 100 is not in use.

Figure 8:
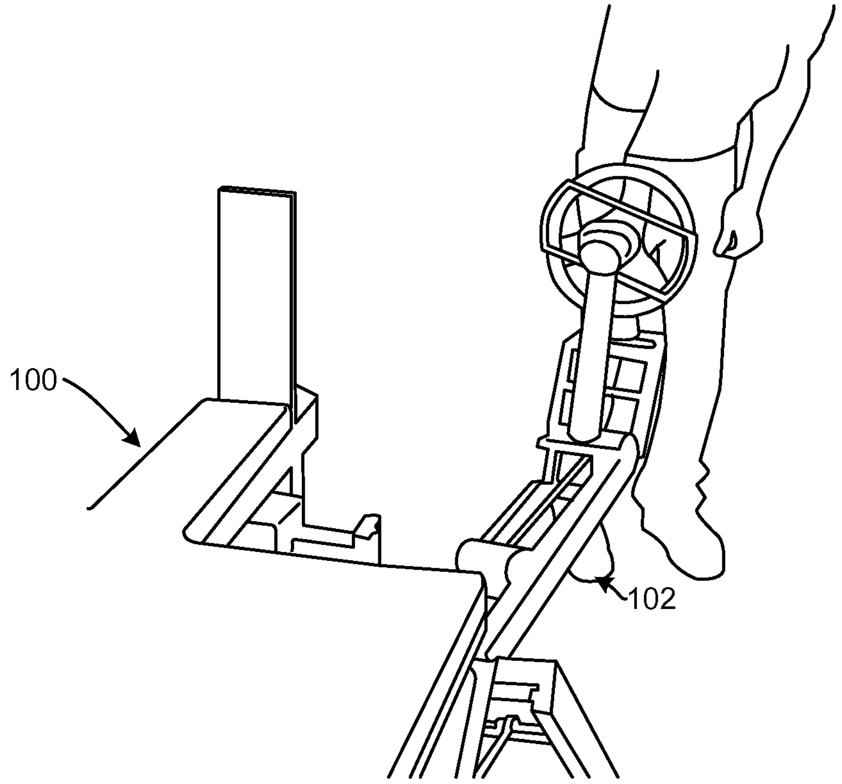
FIG. 8 is an image of a surgical table extension assembly wherein the limb manipulator assembly has been lowered, in accordance with an aspect of the present disclosure.
Figure 9:
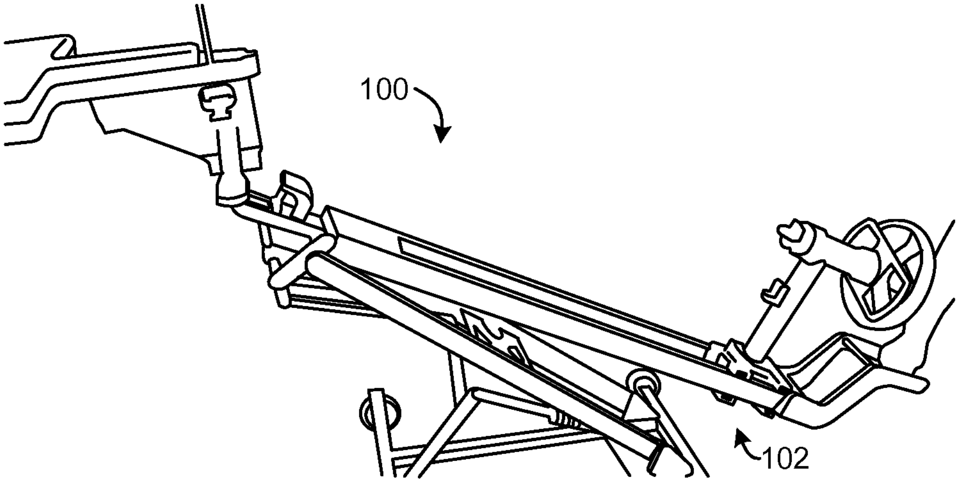
FIG. 9 is a side view of a surgical table extension assembly wherein the limb manipulator assembly has been lowered, in accordance with an aspect of the present disclosure.

Referring now to FIGS. 8 & 9, images of surgical table extension assembly 100 wherein limb manipulator assembly 102 has been lowered, in accordance with an aspect of the present disclosure, are shown. Limb manipulator assembly 102 may drop the patient foot to the floor in order to facilitate a surgical procedure.

Figure 10:
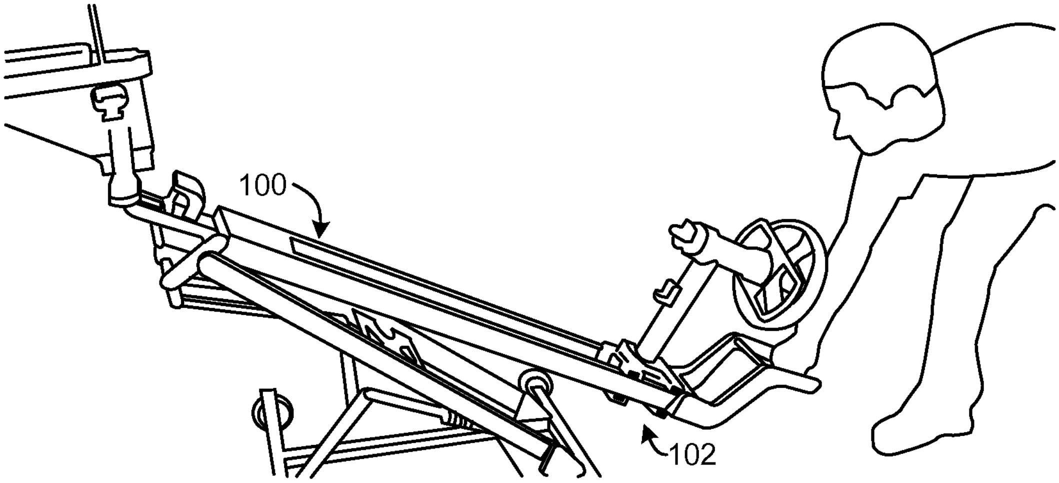
FIG. 10 is a side view of a surgical table extension assembly wherein the limb manipulator assembly has been lowered and rotated toward the sagittal plane, in accordance with an aspect of the present disclosure.

Referring now to FIG. 10, a side view of surgical table extension assembly 100 wherein limb manipulator assembly 102 has been lowered and rotated toward the sagittal plane, in accordance with an aspect of the present disclosure, is shown. Rotation occurs about sagittal connection 130 (adduction or abduction).

Figure 11:
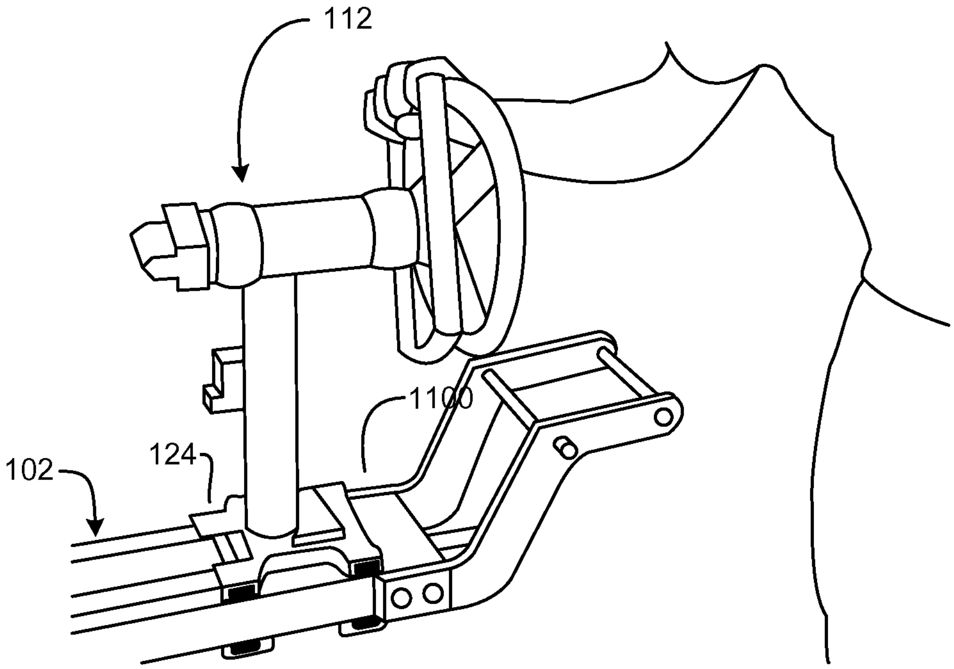
FIG. 11 is a detail view of a limb coupler of a surgical table extension assembly wherein the limb coupler is secured, in accordance with an aspect of the present disclosure.
Figure 12:
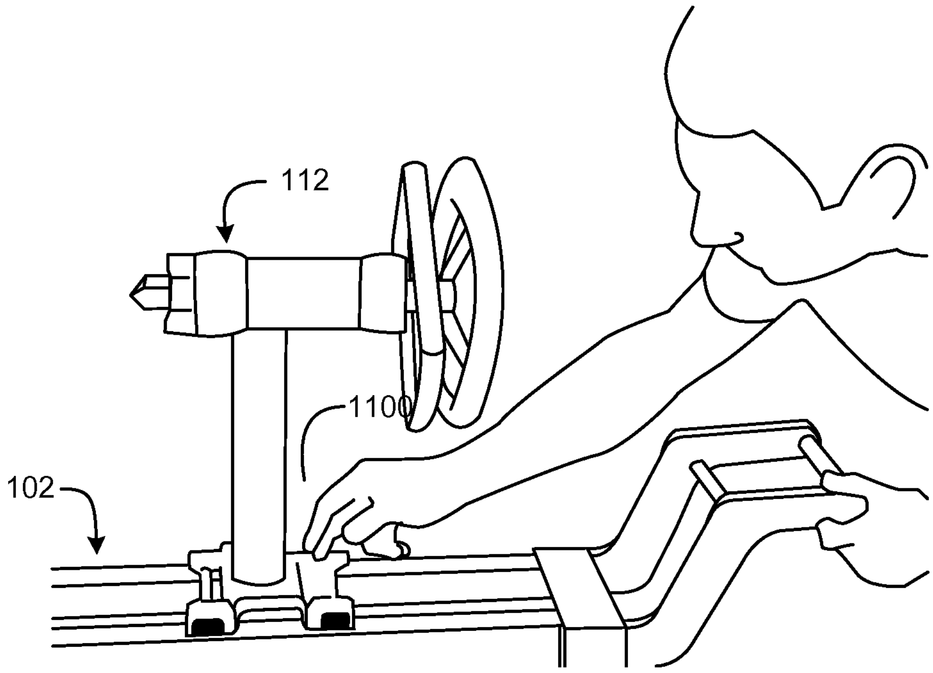
FIG. 12 is a detail view of a limb coupler of a surgical table extension assembly wherein the limb coupler is being moved toward the transverse plane, in accordance with an aspect of the present disclosure.
Figure 13:
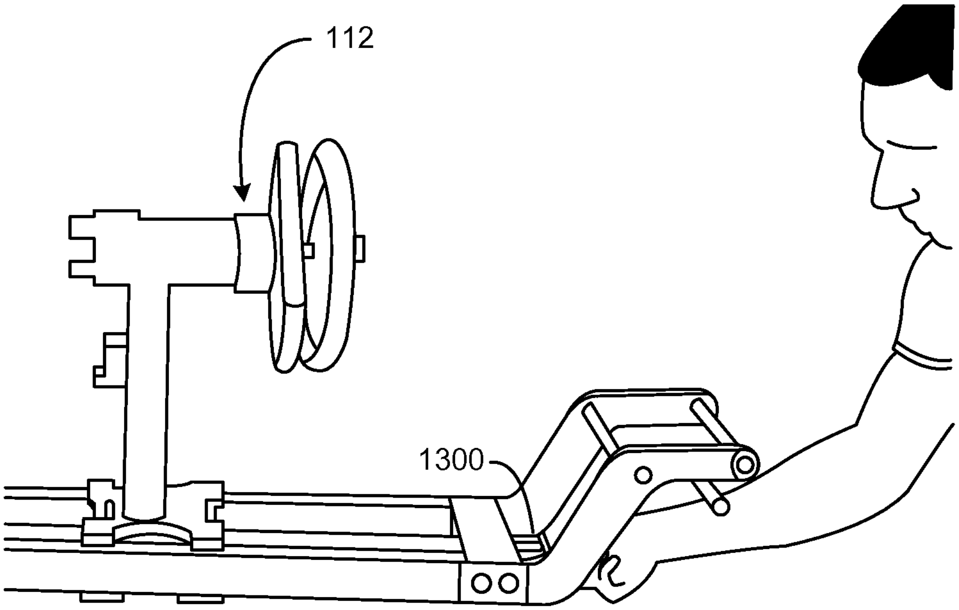
FIG. 13 is a detail view of a limb coupler of a surgical table extension assembly where the limb coupler is being manipulated by a fine movement mechanism, in accordance with an aspect of the present disclosure.

Referring now to FIG. 11, a detail view of a limb coupler 112 of surgical table extension assembly 100 wherein limb coupler 112 is secured, in accordance with an aspect of the present disclosure, is shown. Slide 124 comprises slide lock 1100. When slide lock 1100 is engaged, limb coupler 112 cannot be moved significant distances. That is, gross movement is prevented. When slide lock 1100 is disengaged (FIG. 12), limb coupler 112 can be moved significant distances. Limb coupler 112 may be moved finely via fine control 1300.

Figure 16:
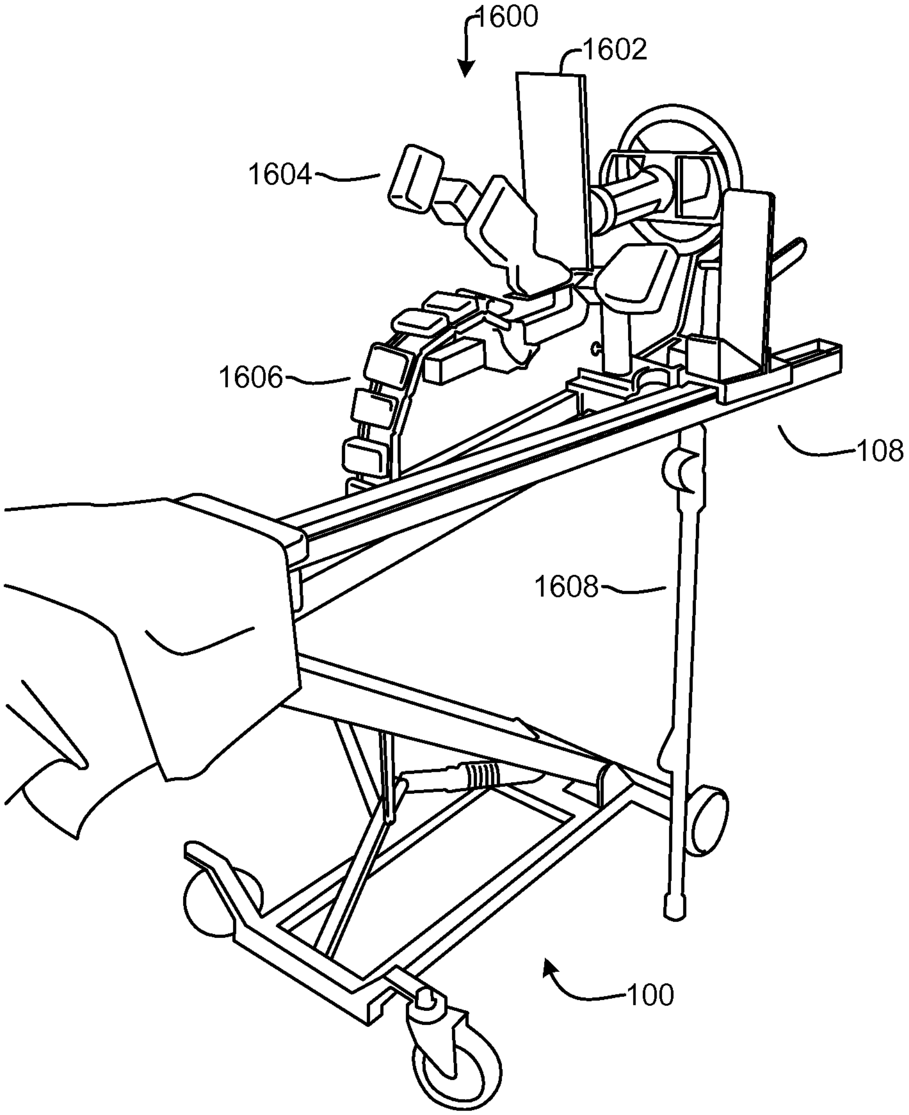
FIG. 16 is an image of a surgical table extension assembly equipped with a brace assembly and a support rod, wherein the base is fully deployed, in accordance with an aspect of the present disclosure.

Referring now to FIG. 16, an image of surgical table extension assembly 100 equipped with brace assembly 1600, in accordance with an aspect of the present disclosure, is shown.

Brace assembly 1600 comprises foot rest 1602, foot restraint 1604, and extension 1606. The patient foot rests against foot rest 1602, which is connected to limb coupler 112 at connector 118. Foot rest 1602 is connected to foot restraint 1604. Torque may be transferred to the patient foot, ankle, and lower leg via manipulation of limb coupler 112. Extension 1606 is a moveable series of linkages extending from foot rest 1602 to above the patient knee at the posterior of the patient thigh. Extension 1606 may be a series of padded linkages. Extension 1606 is placed against the posterior portion of the patient leg. The patient leg is wrapped with a compress cohesive bandage such as Coband (available from 3M Company of St. Paul, Minn.) from above the knee to at the lower leg, binding extension 1606 to the patient leg. Torque is transferred to the thigh via extension 1606, thereby more evenly distributing torques applied. Extension 1606 and the bandage create a flexible connection to the patient leg, allowing for flexion and extension of the patient knee during manipulation. Brace assembly 1600 provides desirable access to the proximal femur during direct anterior hip replacement procedures while requiring less rotation of the patient leg. In an aspect, the patient leg needs to be rotated 90 degrees, as compared to 130 degrees or more when utilizing a traction boot.

In some aspects, support rod 1608 may be used to provide foundational support and stability to dynamic limb support 108. Support rod 1608 may be physically separate from limb support 108, or it may be integrated with limb support 108 such as by being attached via a hinge, telescoping upward and downward, or by any other way as may become apparent to those skilled in the relevant art(s) after reading the description herein. Support rod 1608 may have telescoping capabilities regardless of whether it is integrated with limb support 108.

Figure 17:
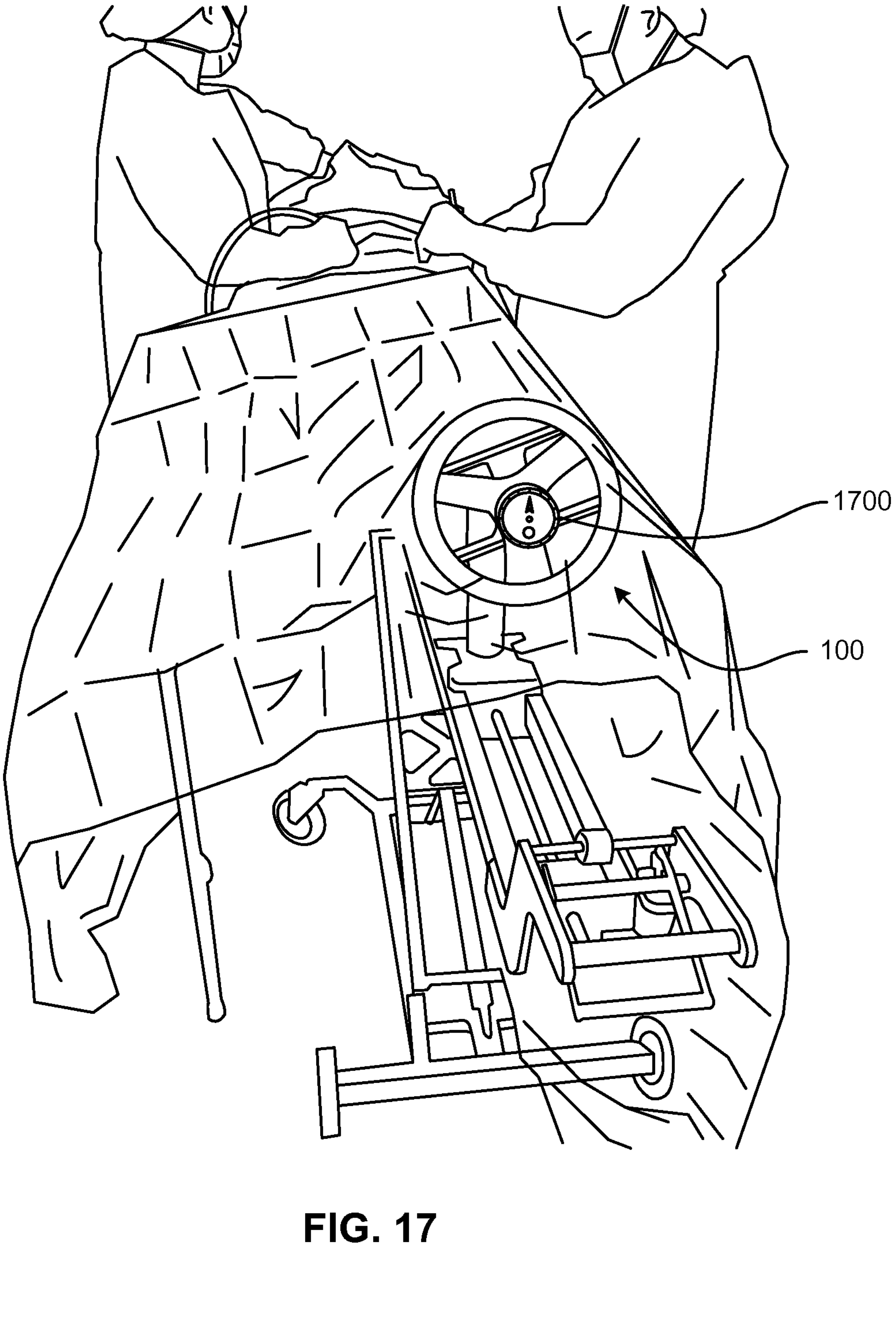
FIG. 17 is an image of a surgical table extension assembly in use, wherein the base is fully deployed, in accordance with an aspect of the present disclosure.

Referring now to FIG. 17, an image of surgical table extension assembly 100 in use, in accordance with an aspect of the present disclosure, is shown. Limb coupler 112 may further comprise orientation indicator 1700. Orientation indicator 1700 indicates the amount of rotation the patient limb is being subjected to.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures.

Further, the purposes of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of the technical disclosure. The Abstract is not intended to be limiting as to the scope of the present disclosure in any way.

What is claimed is:

1. A freestanding patient support apparatus configured to adjust the position of at least one patient limb in coordination with one or successively more surgical tables, comprising:

a rigid, horizontally oriented platform configured to support a patient limb, the platform comprising a fore end and an aft end;

a central connector positioned at a center portion of the platform fore end;

a limb manipulator connected to the platform at the central connector for positioning of a patient limb, the limb manipulator having a limb manipulator proximal end and a limb manipulator distal end, the limb manipulator comprising:

at least one arm;

a limb coupler configured to receive and rotate the patient limb via a limb connector and configured to slide along the at least one arm;

a positioning assembly connected to the limb manipulator proximal end and the platform aft end for rotation of the limb manipulator in a horizontal plane and a vertical plane; and a limb manipulator handle configured for manual rotation of the limb manipulator in the horizontal plane and the vertical plane about the limb manipulator proximal end; and a wheeled, rollable base structure connected to the limb manipulator via at least one support bar, wherein the wheeled base structure provides for movement across a floor to a surgical table or between surgical tables, and wherein the base structure comprises a hydraulic system for simultaneous elevation and retraction of the limb manipulator and the platform.

2. The freestanding patient support apparatus of claim 1, wherein the base structure comprises a rigid, horizontally oriented, open frame comprising:

at least one transversal element;

at least one longitudinal element; and at least one base structure actuator to facilitate movement of the limb manipulator in the vertical plane.

3. The freestanding patient support apparatus of claim 2, wherein the at least one base structure actuator is one of: a linear actuator; a pneumatic ram; a hydraulic piston; and an electric motor.

4. The freestanding patient support apparatus of claim 1, wherein the freestanding patient support apparatus has an overall weight no more than about 75 pounds.

5. The freestanding patient support apparatus of claim 4, wherein the wheeled, rollable base structure comprises at least one locking wheel adapted to engage with the floor surface to ensuring stability, and at least one wheel with continuous rotation capability.

6. The freestanding patient support apparatus of claim 1, wherein the limb coupler comprises a limb coupler body and a receiver configured to removably receive at least one limb coupler accessory;

wherein the receiver includes an adjustable mechanism allowing for adapting to different limb sizes and shapes, and wherein the adjustable mechanism comprises a self-locking gear mechanism for precise positioning of the at least one patient limb.

7. The freestanding patient support apparatus of claim 6, wherein the at least one limb coupler accessory is adapted for protection of the at least one patient limb and is one of: a brace assembly; a brace assembly having adjustable dimensions; a traction boot; and a footrest.

8. The freestanding patient support apparatus of claim 7, the brace assembly comprising at least one of: a footrest; a foot restraint; and an extension.

9. The freestanding patient support apparatus of claim 8, wherein the brace assembly comprises the extension having a plurality of members pivotally connected to one another and configured to span a posterior portion of the at least one patient limb from a patient foot to a patient thigh and support a patient first limb in various states of flexion, wherein the extension is adjustable to accommodate different thigh angles; and the brace assembly stabilizes the patient first limb enabling a full limb rotation while reducing non fluid rotation of the patient first limb.

10. The freestanding patient support apparatus of claim 1, the limb coupler further comprising;

a limb coupler handle for rotating the limb connector; and a coupler lock release positioned adjacent to the limb coupler handle, the coupler lock release disengaging a limb connector rotation lock when squeezed toward the limb coupler handle.

11. The freestanding patient support apparatus of claim 1, further comprising at least one hip lift component, the at least one hip lift component comprising:

a hip lift actuator configured to adjust the position of a patient hip; and a hip support.

12. The freestanding patient support apparatus of claim 11, wherein the hip lift actuator is one of: a linear actuator; a pneumatic ram; a hydraulic piston; an electric motor; and a pneumatic piston.

13. The freestanding patient support apparatus of claim 1, wherein the limb manipulator handle is located at the limb manipulator distal end and releases a limb manipulator vertical lock when actuated, and wherein the adjustable mechanism comprises a self-locking gear mechanism for precise positioning of the at least one patient limb.

14. The freestanding patient support apparatus of claim 1, further comprising a removable rigid limb support removably attachable to the platform aft end at a limb support proximal end, the limb support configured to maintain a substantially stationary position of a patient second limb.

15. The freestanding patient support apparatus of claim 1, wherein:

the central connector rotatably connects the limb manipulator to the platform and the central connector; and the positioning assembly is configured to position the limb manipulator for use with a right patient limb and a left patient limb.

16. The freestanding patient support apparatus of claim 1, further comprising:

a base structure actuator; and a plurality of linking arms pivotally interconnected in a sequential fashion via a plurality of linking arm fasteners;

wherein the plurality of linking arms connect to the limb manipulator and the base structure to facilitate the vertical movement of the at least one limb manipulator relative to the base structure and to move the apparatus from a vertically extended deployed position to a collapsed storage position with each linking arm including a locking mechanism for securing the apparatus in the deployed position.

17. The freestanding patient support apparatus of claim 16, wherein the base structure actuator is securely affixed at a first end to one of the plurality of linking arms and affixed at a second end to the base structure.

18. The freestanding patient support apparatus of claim 1, further comprising a removable, vertically oriented support post removably attachable to a center of the platform aft end and configured to contact a patient perineum.

19. The freestanding patient support apparatus of claim 1, further comprising a femoral support elevator attached to the wheeled base structure, wherein the femoral support elevator is adjustable in height and angle to support a patient's femur during surgery.

20. The freestanding patient support apparatus of claim 1, wherein the limb manipulator comprises a spherical spatial positioning system with a clutch based system that allows rotational movement when engaging a release handle and locking the rotation when the handle is released.

* * * * *